A. H. OBERLIN.
NON-SKID APPLIANCE.
APPLICATION FILED MAY 12, 1916.
1,207,785. Patented Dec. 12, 1916.
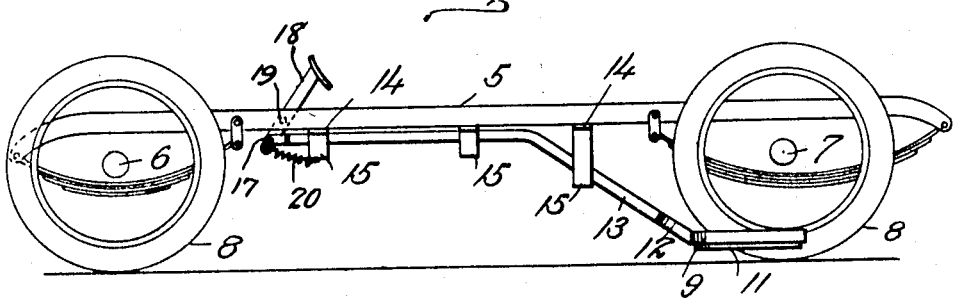
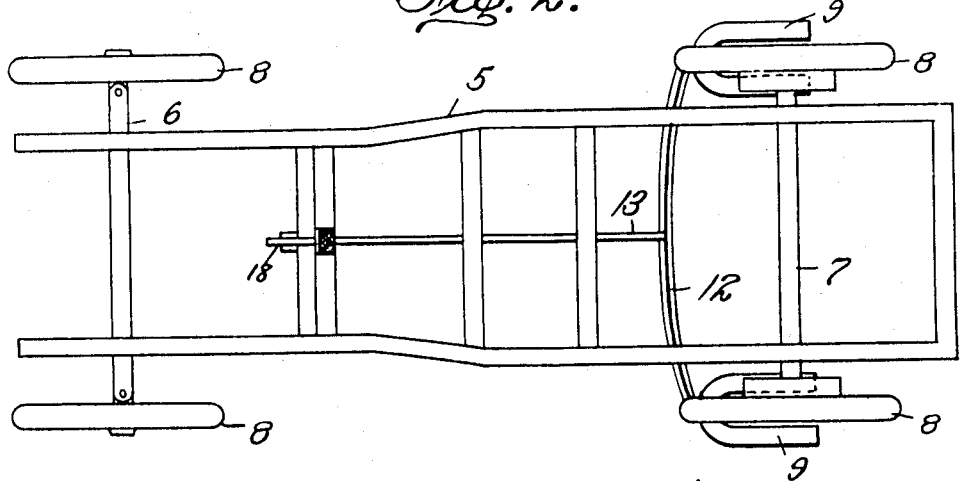
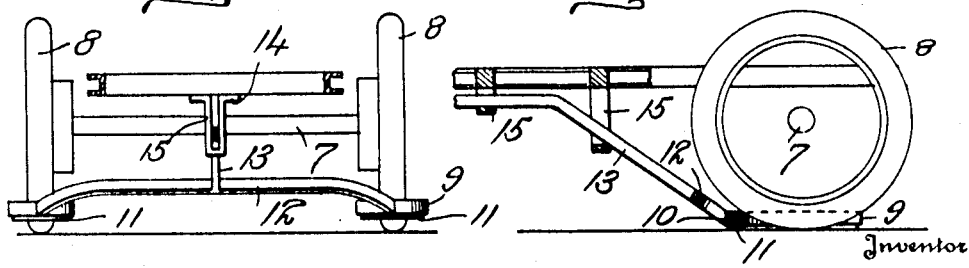
Inventor
A. H. Oberlin

UNITED STATES PATENT OFFICE.

AUGUST H. OBERLIN, OF LONG ISLAND CITY, NEW YORK.

NON-SKID APPLIANCE.

1,207,785.  Specification of Letters Patent.  Patented Dec. 12, 1916.

Application filed May 12, 1916. Serial No. 97,090.

*To all whom it may concern:*

Be it known that I, AUGUST H. OBERLIN, a citizen of the United States, residing at Long Island City, in the county of Queens, State of New York, have invented certain new and useful Improvements in Non-Skid Appliances; and I do hereby declare the following to be a full, clear, and exact description of the invention, such as will enable others skilled in the art to which it appertains to make and use the same.

This invention is directed to an improved appliance by which skidding of motor propelled vehicles may be controlled and prevented.

An object of the present invention resides in the provision of an anti-skid appliance which is applicable to motor vehicles generally and operable to successfully meet and check a skid of the vehicle no matter what its direction with respect to the line of travel.

The invention further resides in an appliance of this character which will embody the desired features of simplicity, efficiency, reliability and convenience, which may be easily manipulated, and may be manufactured and marketed at a relatively low cost.

With the above and other objects of similar nature in view, the invention consists in the construction, combination and arrangement of parts, set forth in and falling within the scope of the appended claim.

Figure 1 is a side elevation of a motor vehicle with the invention associated therewith and in inoperative position, Fig. 2 is a top plan view thereof, Fig. 3 is a longitudinal section through the rear portion of the structure, and, Fig. 4 is a transverse section looking rearwarly toward the brake shoes.

Referring now more particularly to the accompanying drawing, there is illustrated, conventionally, a motor vehicle chassis, including the frame 5, front and rear axles 6, 7 and wheels 8.

The invention, broadly viewed, is disposed beneath the frame 5 of the vehicle chassis where it will lie for the most part concealed by the body (not shown). Specifically the appliance comprises a pair of combined wheel and ground engaging shoes 9, each of which consists of a substantially U-shaped channel member, with the channel 10 thereof opening downwardly and provided with a filler 11 of rubber or other suitable material. This filler may be vulcanized or otherwise secured in the channels of the respective shoe and projects below the latter for the entire length of the U. Connecting the shoes 9 and secured thereto by welding or other process is an arch 12 which arch extends transversely of the vehicle chassis and carries centrally thereof an upwardly inclined, forwardly extending arm 13.

Suitably supported as at 14 from the vehicle frame is a central longitudinal series of depending guide members 15. Each of the guides 15 is of substantially U-shaped construction, the rearmost thereof being of a length considerably greater than the others and receiving between its legs the arm 13 above described. The arm 13 also extends forwardly through the other of the guides 15 and is terminally connected at 17, with a foot lever 18 pivoted as at 19 to the frame 5 and extending thereabove for convenient manipulation by the driver of the vehicle. A spring 20 connected with the frame 5 and lever 18 is provided to maintain the appliance at its forward limit of movement, in which position the shoes 9 are disposed out of engagement with the wheels and ground. However, if, during the course of travel of the vehicle, the wheels thereof should slip or skid and thus endanger the vehicle and its occupants, the driver may quickly apply his foot to the lever 18 and, thrusting the same forward, operate the appliance to control and prevent such skid. Upon operation of the lever, the appliance will be bodily moved rearwardly of the machine, the arm 13 at the same time swinging downwardly through the smaller guides 15 and being slidably supported by the bight of the longer of said guides to carry the shoes 9 into ground engaging position. The shoes will thus be disposed with their legs to each side of the corresponding wheel and the fillers 11 in contact with the ground, while their bight portions will be wedged firmly between the wheels and ground as illustrated in Fig. 4. It is obvious that in this manner, skidding of the vehicle may be readily controlled, the shoes each serving in the combined capacity of a drag, chock and brake, to check and, if desired, entirely stop further progress of the vehicle. When pressure upon the lever 18 is removed the several parts of the appliance will be again returned, by the spring 20, to their normal or inoperative position as illustrated in Fig. 2.

What I claim is:—

An anti-skid appliance for vehicles, comprising rigidly connected brake shoes operatively supported beneath the vehicle frame, each of said shoes being substantially U-shaped and disposed to straddle a wheel of the vehicle, and means for operating said shoes to dispose the legs thereof into engagement with the ground at opposite sides of the respective wheel and wedge the bight portions thereof between the ground and the wheels.

In testimony whereof, I affix my signature, in the presence of two witnesses.

AUGUST H. OBERLIN.

Witnesses:
NICHOLAS GROSKINSKY,
WM. O'DONNELL.

Copies of this patent may be obtained for five cents each, by addressing the "Commissioner of Patents, Washington, D. C."